US007034085B2

(12) United States Patent
Mestach et al.

(10) Patent No.: US 7,034,085 B2
(45) Date of Patent: Apr. 25, 2006

(54) METHOD FOR POLYMERIZING ETHYLENICALLY UNSATURATED MONOMERS BY DEGENERATIVE IODINE TRANSFER

(75) Inventors: Dirk Emiel Paula Mestach, Nijlen (BE); Richard Hendrikus Gerrit Brinkhuis, Zwolle (NL); Petrus Johannes Maria David Elfrink, Boxmeer (NL)

(73) Assignee: Nuplex Resins, B.V., Bergen Op Zoom (NL)

( * ) Notice: Subject to any disclaimer, the term of this patent is extended or adjusted under 35 U.S.C. 154(b) by 0 days.

(21) Appl. No.: 10/619,991

(22) Filed: Jul. 15, 2003

(65) Prior Publication Data
US 2004/0054108 A1 Mar. 18, 2004

Related U.S. Application Data

(60) Provisional application No. 60/424,571, filed on Nov. 7, 2002.

(30) Foreign Application Priority Data
Jul. 23, 2002 (EP) .................................. 02078523

(51) Int. Cl.
*C08F 8/18* (2006.01)
(52) U.S. Cl. ................. 525/359.1; 525/359.5; 525/412; 526/78; 526/89; 526/201; 526/206; 526/237
(58) Field of Classification Search .......... 526/78, 526/89, 201, 206, 237; 525/359.1, 359.5, 525/412
See application file for complete search history.

(56) References Cited

U.S. PATENT DOCUMENTS

| 3,983,187 | A | | 9/1976 | Moczygemba et al. | 260/880 R |
|---|---|---|---|---|---|
| 4,055,713 | A | | 10/1977 | Moczygemba et al. | 526/207 |
| 4,158,678 | A | | 6/1979 | Tatemoto et al. | 260/884 |
| 5,359,018 | A | | 10/1994 | Yeh | 526/221 |
| 5,371,151 | A | | 12/1994 | Berge et al. | 525/377 |
| 5,399,641 | A | | 3/1995 | Yeh | 526/221 |
| 5,439,980 | A | * | 8/1995 | Yutani et al. | 525/276 |
| 5,578,544 | A | | 11/1996 | Yeh | 502/226 |
| 6,143,848 | A | | 11/2000 | Lee et al. | 526/212 |

FOREIGN PATENT DOCUMENTS

| EP | 489 370 B1 | 6/1992 |
|---|---|---|
| EP | 947 527 A1 | 10/1999 |
| JP | 4-132706 | 5/1992 |
| JP | 4-149207 | 5/1992 |
| JP | 11-140127 | 5/1999 |
| JP | 2000-86710 | 3/2000 |
| JP | 2000-327713 | 11/2000 |
| WO | WO 02/061641 A1 | 8/2002 |

OTHER PUBLICATIONS

European Search Report Application No. EP 02 07 8523 dated Nov. 28, 2002.
Patent Abstracts of Japan abstracting JP 4-132706 (1992).
Patent Abstracts of Japan abstracting JP 4-149207 (1992).
Patent Abstracts of Japan abstracting JP 11-140127 (1999).
Patent Abstracts of Japan abstracting JP 2000-86710.
Patent Abstracts of Japan abstracting JP 2000-327713.
Matyjaszewski, et al., "Living' and Controlled Radical Polymerization," Journal of Physical Organic Chemistry, vol. 8, No. 4 (1995) p.p. 306-315.
Gaynor, et al., "Controlled Radical Polymerization by Degenerative Transfer : Effect of the Structure of the Transfer Agent," Macromolecules 1995, vol. 28, No. 24, p.p 8051-8056.
Butté et al., "Miniemulsion Living Free Radical Polymerization of Styrene," Macromolecules 2000, vol. 33, No. 9, p.p. 3485-3487.
Lansalot, et al., "Controlled Free-Radical Miniemulsion Polymerization of Styrene Using Digenerative Transfer," Macromolecules 1999, vol. 32, No. 22, p.p. 7354-7360.
Goto, et al., "Mechanism and Kinetics of Iodide-Mediated Polymerization of Styrene," Macromolecules 1998, vol. 31, No. 9, p.p. 2809-2814.

(Continued)

*Primary Examiner*—Bernard Lipman
(74) *Attorney, Agent, or Firm*—Howrey LLP

(57) ABSTRACT

The invention pertains to a method for making a block or gradient final (co)polymer comprising a step of radically polymerizing a mixture of ethylenically unsaturated monomers in the presence of a) a radical precursor and b) an iodine atom-containing intermediate polymer or a mixture of iodine atom-containing intermediate polymers, wherein the iodine atom-containing intermediate polymer comprises at least 50 mole % of methacrylate monomers and is obtainable from a polymerization of ethylenically unsaturated monomers.

42 Claims, No Drawings

OTHER PUBLICATIONS

Matyjaszewski, et al., "Controlled Radical Polymerizations: The Use of Alkyl Iodides in Degenerative Transfer," Macromolecules 1995, vol. 28, No. 6, p.p. 2093-2095.

Farcet, et al., "Polystyrene-block-poly(butyl acrylate) and polystyrene-block-poly[butyl acrylate)-co -styrene] block copolymers prepared via controlled free-radical miniemulsion polymerization using degenerative iodine transfer," Macromol. Rapid Commun. 2000, vol. 21, No. 13, p.p. 921-926.

Website document for Klumperman, B. at the UNESCO School & South African IUPAC conference on Macromolecular and Materials Science, Mar. 29-31, 1999.

Website document for Klumperman, B. at the UNESCO School & South African IUPAC conference on Macromolecular and Materials Science, Apr. 10-12, 2000.

Lissi et al., "Methyl Methactylate Polymerization in the Presence of Iodine," J. Polym. Sci., Polymer Letters Edition, vol. 14, No. 8 (1976); p.p. 499-502.

Derwent Abstract No. 1976:494752 abstracting Lissi et al., J. Polym. Sci., Polym. Lett. Ed. (1976), 14(8), p.p. 499-502.

Ghosh et al., "Chain Transfer in Presence of Halogens in the Polymerization of Methylmethacrylate," J. Polym. Sci., Polymer Letters Edition, vol. 13, No. 1 (1975), p.p. 35-38.

Derwent Abstract No. 1975:125644 abstracting Ghosh et al., J. Polym. Sci., Polym. Lett. Ed. (1975), 13(1), p.p. 35-38.

Matyjaszewski, K., "Classification and Comparison of Various Controlled/"Living" Radical Polymerizations," Polym. Prep. (ASC, Div. Polym. Chem.), vol. 40, No. 2 (1999), p.p. 309-310.

Derwent Abstract No. 1999:558824 abstracting Matyjaszewski, Polym. Prepr. (Am. Chem. Soc., Div. Polym. Chem.) (1999), 40(2), pp. 309-310.

Barson, et al., "Iodoform as a transfer agent in radical polymerizations," Polymer, vol. 37, No. 25 (1996), p.p. 5699-5702.

English language abstract of Kobunshu Ronbunshu, vol. 49, No. 10 (1992), p.p. 765-783.

Abstract from the Book of Abstracts, 218th ACS National Meeting, New Orleans, Aug. 22-26 (1999) abstracting POLY-042.

Abstract from the Book of Abstracts, 218th ACS National Meeting, New Orleans,Aug. 22-26 (1999) abstracting POLY-525.

Puts, et al., "Telechelic Acrylic Polymers Using Degenerative Iodine Transfer Polymerization," Polym. Prepr. (ACS, Div. Polym. Chem.), vol. 40, No. 2 (1999), p. 415.

Abbey, et al., "Reactive Dimers of Methacrylates by Metal Catalyzed Chain Transfer," Polym. Mater. Sci. Eng., vol. 55 (1986), p. p. 235-238.

De León- Sáenz et al., "New Insights into the mechanism of 1,2-bis (trimethyl-silyloxy)-tetraphenylethane-induced free radical polymerization: appication to the synthesis of block and graft copolymers," Macromol. Chem. Phys., vol. 201, No. 1 (2000), p.p. 74-83.

Balczewski et al., "Iodine atom transfer addition reaction of 1-iodoalkyl phosphonates to alkenes in the presence of $\alpha,\alpha'$-azoisobutyronitrile (AIBN): mechanistic aspects," New J. Chem., vol. 25 (2001), p.p. 659-663.

Muller, et al., "Kinetic Analysis of "Living" Polymerization Processes Exhibiting Slow Equilibria," Macromolecules 1995, vol. 28, No. 12, p.p. 4326-4333.

* cited by examiner

МЕТHOD FOR POLYMERIZING ETHYLENICALLY UNSATURATED MONOMERS BY DEGENERATIVE IODINE TRANSFER

RELATED APPLICATIONS

This application claims priority based on European Patent Application No. 02078004.5, filed Jul. 23, 2003, and U.S. Provisional Patent Application No. 60/424,571, filed Nov. 7, 2002.

SUMMARY OF THE INVENTION

The invention pertains to a method to prepare a block or gradient co-polymer comprising a step of radically polymerizing a mixture of ethylenically unsaturated monomers.

BACKGROUND OF THE INVENTION

Controlled radical polymerization processes have received much attention over the past decade, because of the possibility to prepare new valuable polymeric materials based on standard conventional monomeric building blocks, such as block or gradient copolymers, and narrow-polydispersity functional polymers, with narrower functionality distributions, that can be used in film-forming or cross-linking compositions, such as coating compositions, adhesives and printing ink formulations.

In the field of "living" radical polymerizations (polymerizations under radical conditions where termination processes of growing radicals are reversible, so that all initiated chains can, in principle, continue to grow as long as monomers and radicals are present), three technologies have been studied in depth:

nitroxide mediated polymerizations (NMP), which are based on homolytic scission of the covalent bond formed between a polymer radical and a nitroxide stable radical;

atom transfer radical polymerization (ATRP), in which a halogen (usually Cl or Br) atom is reversibly transferred between a Cu(I/II) complex and a polymer radical, in a process that encompasses a redox cycle;

reversible addition fragmentation chain transfer (RAFT), which is a process wherein dithioester end groups can be rapidly and reversibly transferred between polymeric radicals.

For all these systems, the living character was proven by a typically linear development of molecular weight with conversion, low polydispersities obtained in polymerizations, and the preparation of block copolymers by sequential addition of different monomers.

ATRP and RAFT especially have possibilities for numerous applications with respect to the types of monomers used. In ATRP, however, acidic conditions and acidic monomers create problems, while the necessary removal of the Cu-amine complexes from the polymers is an expensive and thus unwanted step. In RAFT, these limitations do not occur, but this method suffers in that the polymer chains formed contain dithioester end groups, which are strong chromophores. The chromophores can be destroyed by reaction with a nucleophile, but this nucleophile is not always compatible with the functional groups that may be present in the chains. Such chromophore destruction comes at the expense of an extra reaction step and leads to low-molecular weight products in the polymer, which may be difficult to remove. Moreover, the dithioester mediating compounds are expensive.

In general, RAFT based on dithio-ester compounds is assumed to be favourable in the rate of end group transfer (more transfer events, lower polydispersity, better control). A lower polydispersibility is desirable when the polymer is used in e.g. film-forming or cross-linking compositions. A narrow molecular weight distribution in such applications leads to a good balance of pot life and curing speed, viscosity and network properties. Further, in the art it is assumed that the RAFT process is applicable to a broad range of monomers.

NMP has the disadvantage that expensive nitroxides are needed if the process is to be used at acceptably low temperatures for acrylates, whereas methacrylates have intrinsic problems due to the fact that disproportionation may occur as a side reaction.

Another type of living radical polymerization process is degenerative iodine transfer (DIT) (see for instance *Journal of Physical Organic Chemistry*, Vol. 8, 306–315 (1995) and *Macromolecules*, 28, 8051–8056 (1995)). In this process, as in the RAFT process, an iodine end group can transfer from one polymer to a radical end group of another polymer present in the polymerization system, the iodine atom playing a similar role to that of the dithioester group in RAFT, the terminal iodine and the radical function exchanging between two polymer chains. A chain transfer agent with an iodine atom is used as entry in the DIT process. Conventional iodine chain transfer agents include alkyl or perfluoroalkyl iodides.

In *Macromolecules*, 28, 8051–8056 (1995), *Macromolecules*, 33(9), 3485 (2000), *Macromolecules*, 32(22), 7354 (1999), *Macromolecules*, 31(9), 2809 (1998) the DIT process was described for application with styrene monomers, for which it appears to work moderately well (polydispersities typically 1.5), and for application with halogenated vinyl monomers like vinyl chloride and fluorinated vinyl species.

DIT was attempted for acrylates, but the results showed less control (broader polydispersities>2, indicating a low rate of transfer between acrylate chains) (see: *Macromolecules*, 28, 8051–8056 (1995)). DIT processes with acrylates have been disclosed in a few documents: however, these aim at obtaining iodine-functional chains instead of aiming at actual living polymerizations (see for instance U.S. Pat. No. 6,143,848). DIT processes to prepare block copolymers of acrylates and styrene have been reported in EP 947527, *Macromolecules*, 28, 2093 (1995), and *Macromol. Rapid Commun.*, 2000, 21(13), 921.

A few attempts to obtain a degenerative iodine transfer process with methacrylates have been reported, but all of these suggest that methacrylate monomers cannot be used in an acceptable manner in conventional DIT processes using the conventional iodine-functional CTAs, which are applied in the DIT process for e.g. styrene (see for instance *Macromolecules*, 28, 8051 (1995)). High-molecular weight material is formed at the start of the polymerization, leading to high polydispersities, without the typical linear development of molecular weight with conversion, which is characteristic for a polymerization with a living character, being observed. Another comparison of DIT processes with styrene, acrylate, and methacrylate monomers was disclosed in B. Klumperman at the UNESCO School & South African IUPAC conference on Macromolecular and Materials Science, 29–31 Mar. 1999 and 10–12 Apr. 2000.

Here it is also concluded that DIT is not a suitable process for the polymerization of a mixture of monomers containing a large amount of methacrylate monomers. Therefore, it has been assumed that DIT is not suitable for polymerizing methacrylates in a controlled manner, to obtain the benefits that can be obtained in a "controlled (living) radical polymerization" process in the art. In U.S. Pat. No. 5,439,980 this is confirmed in Comparative example 2, where it was found that when MMA alone is used with a fluorinated alkyliodide, only a homopolymer of MMA is produced and a block polymer with an iodide-functional perfluoropolyether is not produced.

Since methacrylates are a very important class of monomers for many applications, with high- and low-polarity candidates and various functional side groups available, with high-Tg backbones with good chemical durability being formed, the inability to use methacrylates is a serious problem in DIT technology, and a need exists for an effective DIT method allowing the production of polymers based on methacrylates with structures that benefit from the advantages of the living nature of the polymerization process.

It is an object of the present invention to obtain a DIT process that can be used for (co)polymerizing methacrylate monomers as in a living radical polymerization process. According to the present invention, it was found that the DIT process can be performed in a very favourable way using methacrylates, if the proper start-up process is chosen. We have found that the DIT process can be adapted for the polymerization of compositions of predominantly methacrylate monomers, to find a high transfer rate of iodine atoms between methacrylate chain ends, leading to better control than a DIT process using styrenic or acrylate monomers, to low polydispersities closely resembling those of ATRP or RAFT processes, molecular weights increasing with conversion, and the opportunity to prepare well defined block and gradient copolymers.

DETAILED DESCRIPTION OF THE INVENTION

We have found a novel method wherein iodine-functional methacrylate polymers are obtained, leading to a DIT process proceeding with a high level of control.

More specifically, the invention pertains to a method for making a block or gradient final co-polymer comprising a step of radically polymerizing a mixture of ethylenically unsaturated monomers in the presence of a) a radical precursor and b) an iodine atom-containing intermediate polymer or a mixture of iodine atom-containing intermediate polymers, wherein the iodine atom-containing intermediate polymer-comprises at least 50 mole % of methacrylate monomers and is obtainable from a polymerization of ethylenically unsaturated monomers.

For clarity purposes the terms "intermediate polymer" and "final polymer" are introduced in this description. However, it has to be understood that the final polymer can be reacted further and that the polymerization steps leading to the intermediate and the final polymer need not follow each other directly, but that there may be (a) further processing or reaction step(s) between the intermediate and final polymer (ization).

The iodine atom-containing intermediate polymers to be formed initially (forming the "first block" if a block polymer is to be made) should predominantly comprise monomers of the methacrylate type, i.e. the polymer comprises at least 50 mole % of methacrylate monomers (in this application methacrylate monomers include methacrylic acid or esters, amides or anhydrides thereof, or methacrylonitrile). This results in the end group of the intermediate polymer being predominantly of the iodine-containing methacrylate type.

Such iodine-containing methacrylate end group has the formula:

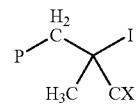

wherein P stands for polymer and CX is an acid, anhydride, ester, amide, or nitrile group.

More preferred is a composition wherein the intermediate polymer comprises more than 70 mole % of methacrylate monomers; most preferred is a composition wherein the intermediate polymer comprises more than 90 mole % of methacrylate monomers. Preferably, the molecular weight of this intermediate polymer is less than 20,000 and more than 500, more preferably less than 10,000, most preferably less than 5,000 and more than 1,000. In this respect the use of the term intermediate oligomer instead of intermediate polymer should be taken into consideration as well. The iodine atom-containing intermediate polymer may additionally comprise other (co)monomers which may be of the (meth) acrylate, styrene, vinyl ester, and maleate type.

The polymerization step leading to the final polymer can be performed with the iodine atom-containing intermediate polymer and a monomer or a mixture of monomers, the composition of which may be different from the composition of the iodine atom-containing intermediate polymer, in the presence of a radical precursor.

Examples of suitable mixtures for making the final and intermediate polymers comprise monomers selected from, e.g. acrylic acid, methacrylic acid, methyl acrylate, ethyl acrylate, butyl acrylate, methyl methacrylate, ethyl methacrylate, butyl methacrylate, glycidyl methacrylate, glycidyl acrylate, 2-hydroxyethyl acrylate, 2-ethylhexyl acrylate, potassium methacrylate, cyclohexyl methacrylate, 2-(dimethylamino)ethyl methacrylate, stearyl methacrylate, 2-hydroxyethyl methacrylate, 2-hydroxypropyl methacrylate, vinyl methacrylate, benzyl methacrylate, lauryl methacrylate, diacetone acrylamide, acrylamide, acrolein, methacrylamide, methacrolein, acrylonitrile, methacrylonitrile, styrene, alphamethyl styrene, vinyl toluene, isopropenyl-isopropylidene isocyanatobenzene (mTMI from Cytec), chlorostyrene, butadiene, isoprene, chloroprene, maleic acid, maleimide, methyl maleate, ethyl maleate, propyl maleate, butyl maleate, calcium maleate, allyl maleate, 2-ethylhexyl maleate, octyl maleate, maleic hydrazide, maleic anhydride, fumaric acid, methyl fumarate, ethyl fumarate, propyl fumarate, butyl fumarate, sodium fumarate, fumaronitrile, fumaryl chloride, vinyl acetate, tert-decanoic acid ethenyl ester (VeoVa® 10, ex Resolution Performance Products), neononanoic acid ethenyl ester (VeoVa® 9, ex Resolution Performance Products), vinyl pivalate, and the like. It is not necessary that methacrylate monomers are predominantly present in the mixture for the final polymer, and this mixture may even be free of methacrylic monomers. If the monomers selected for this final polymerization step are predominantly of the methacrylate type, the process can then be repeated to form a third or further block, or gradient copolymers can be obtained, as is obvious to the skilled person.

The weight ratio of the iodine atom-containing intermediate polymer to the monomers being polymerized to form the final polymer may vary from 1:100 to 100:1.

Optionally, the amounts are selected so that the mole ratio iodine atom-containing intermediate polymer b): radical precursor a) is >0.1n, more preferably >0.5n, wherein n stands for the number of radicals effectively generated per molecule of radical precursor (i.e. taking into account the initiator efficiency).

The final polymerization process can take place in batch mode or semi-batch mode, with feeding of several of the reactants to the vessel, or in a process comprising a continuous step. The iodine-functional methacrylate intermediate polymers of the DIT type can be transferred and used as a CTA in the final polymerization process according to the invention.

The final polymerization can be carried out in bulk, in an organic solvent or in an aqueous medium, in a suspension polymerization process, an emulsion polymerization process, a dispersion polymerization process, or a mini-emulsion polymerization process.

The iodine atom-containing intermediate polymer is made from the monomer mixtures as mentioned above for the final polymer, provided that the amount of methacrylic monomers is so selected that at least 50 mole % of the monomers are of the methacrylate type. The polymerization leading to the intermediate polymer is performed in the presence of $I_2$ or an effective iodine chain transfer agent (CTA) d) and a radical precursor c). The term iodine as used in this application includes $I_2$ and $I_2$-precursors (i.e. compounds that can form $I_2$ in situ), such as N-iodosuccinimide, ICl, IBr, and $I_3^-$. Iodine chain transfer agents and iodine are used in combination with a small amount of radical precursor to obtain a methacrylate intermediate polymerization process.

When molecular iodine is used, the iodine radical released after one iodine is abstracted by a polymer radical does not reinitiate a methacrylate polymerization, but recombines with another polymer radical. The net effect of molecular iodine is the functionalization of two polymer chains with an iodine end group, in an identical way (*J. Polym. Sci. Polym. Lett. Ed.*, Vol. 14, 499–502 (1976)). In terms of the intermediate polymerization process, it implies that slightly more than 1 equivalent of initiating radicals should be generated, compared to the iodine atoms present in the systems as molecular iodine. The mole ratio $I_2$: radical precursor d) preferably is between 0.05n and 0.5n, more preferably between 0.1n and 0.5n, and most preferably between 0.25n and 0.5n, wherein n has the previously given meaning. This route to obtaining the low-molecular weight intermediate I-terminated polymers is very effective, and is a preferred embodiment.

An example of an effective iodine CTA (rapidly allowing transfer of the iodine to methacrylate polymer radicals) is a sulfonyl iodide, e.g. p-toluene sulfonyl iodide. When such an iodine CTA is used, preferably the mole ratio of iodine CTA: radical precursor d) is >0.1n, more preferably >0.5n, wherein n stands for the number of radicals effectively generated per molecule of radical precursor.

The most preferred process according to the present invention is the one wherein iodine is used.

It was found to be advantageous sometimes to perform the polymerization step(s) of the method according to this invention in the presence of an epoxide-containing compound, especially the DIT polymerization to form the intermediate polymer. In the presence of epoxide-containing compounds the polydispersity obtained is narrower, leading to coating compositions with a good balance of pot life and curing speed, viscosity and network properties. Similarly, such epoxide-containing compound can also be used in the synthesis of the final polymer. Such compounds are preferably selected from glycidyl ethers, glycidyl esters, and cycloaliphatic epoxides. Suitably glycidyl-containing monomers are used in the preparation of the iodine atom-containing polymer, such as glycidyl methacrylate, glycidyl acrylate and the glycidyl ester of neodecanoic acid (Cardura® E10). The method according to the invention is preferably performed such that the mole ratio epoxide: iodine atom-containing polymer b) is >0.01, preferably >0.05.

Although the essence of the present invention is the radical polymerization of a mixture of ethylenically unsaturated monomers in the presence of a) a radical precursor and b) an iodine atom-containing polymer or a mixture of iodine atom-containing polymers, the invention also pertains to the two-step procedure for making a block or gradient co-polymer comprising a step of radically polymerizing a mixture of ethylenically unsaturated monomers to give iodine atom-containing polymers b) comprising at least 50 mole % of methacrylate monomers in the presence of c) a radical precursor and d) $I_2$ or a iodine chain transfer agent, followed by a step of radically polymerizing a mixture of ethylenically unsaturated monomers in the presence of a) a radical precursor and b) the iodine atom-containing polymer of the first step. The second step may be started before the first step is fully ended.

Also in this two-step procedure the mole ratio sulfonyl iodide: radical precursor is >0.1n, wherein n stands for the number of radicals effectively generated per molecule of radical precursor, or wherein the mole ratio $I_2$: radical precursor is between 0.05n and 0.5n.

The polymerization process(es), i.e. the process leading to the intermediate polymer and/or the process leading to the final polymer, of the monomers take(s) places at temperatures of less than 130° C., preferably less than 110° C., even more preferably less than 90° C., most preferably less than 70° C. It is preferred that a precursor of mild initiating radicals is used as a radical precursor. Mild initiating radicals are for example C-centered radicals, preferably C-centered radicals obtained from the decomposition of azo radical initiators. Initiators of the azo-type include azobisisobutyronitrile (AIBN) or azobisvaleronitrile.

As indicated above, the final polymer may be reacted further. It may be advantageous to modify the iodine end groups-containing polymers formed in the process according to the invention in a process after or during the polymerization. The end groups can be modified, e.g., by elimination, cyclization, atom transfer, redox, or substitution reaction, optionally under removal of iodine and/or low-molecular weight iodine-containing compounds. More specifically, the removal of the iodine atom may be done by any mechanism known to the skilled person such as a nucleophilic reaction, by heating of the polymer (leading to homolytic scission but also to elimination products), or by reaction with a radical generating compound. It may be favourable to perform such thermal or radical reactions in the presence of reducing conditions to scavenge iodine radicals or $I_2$ formed.

The nucleophilic reaction can suitably be performed using mercaptopropionic acid in combination with a base. The radical-generating compound may be a peroxide, for example $H_2O_2$. A radical reaction under reducing conditions can be performed by heating the iodine-functional polymers in the presence of sodium formaldehyde sulfoxylate.

The final polymer prepared by the method according to this invention can be used in film-forming or cross-linking compositions such as coating compositions, adhesives, and (printing) ink formulations. Block or gradient copolymer products made by the method according to the invention can be used as rheology additives, surfactants, dispersants, adhesion promotors and/or flow improvement additives.

Prefered coating compositions include coating compositions that can be used in automotive and general industrial coating applications.

The invention is further illustrated with the following examples.

All reported molecular weights were determined by size exclusion chromatography (RI detection) and are expressed in polystyrene equivalent molecular weights, unless specified otherwise. Low-molecular weight materials (M<500), originating e.g. also from initiator in cage recombination products and optionally added low-molecular weight epoxides, were not taken into account for this determination of the main polymer envelope in the molecular mass distribution. The following abbreviations are used: MMA=methyl methacrylate, GMA=glycidyl methacrylate; BA=butyl acrylate, BMA=butyl methacrylate, HEMA=hydroxyethyl methacrylate, SEC=size exclusion chromatography, Mn=number average molecular weight, Mw=weight average molecular weight, Mz=Z-average molecular weight. The polydispersity of the polymers was determined as the ratio Mw/Mn.

The effect of copolymerizing methacrylates and acrylates on molar mass distribution, wherein the molar mass and the polydispersity are taken as a measure of the extent of control, is illustrated by the following examples. It can be seen that control is lost if the fraction of acrylate monomers becomes too high. These experiments show that upon using MMA/BA ratios with a good control gradient, copolymers are obtained due to the higher polymerization reactivity of MMA monomer vs. BA monomer, as is known in the art.

In general, all copolymerizations carried out under conditions which allow for composition drift will produce gradient copolymers under the conditions of the DIT process in this invention.

EXAMPLE 1

A reaction vessel was charged with 21.25 g of MMA, 5.32 g of BA, 20 g of butyl acetate, 1.54 g of $I_2$, and 2.258 g of 2,2'-azobis(2,4-dimethylvaleronitrile), degassed, and maintained under a nitrogen atmosphere. The temperature was raised to 67° C., and the reaction was continued for 8 h. After 1 h and 40 min, the brown iodine colour was observed to fade, an observation that coincided with a steep increase of conversion with time, after the inhibition period in the presence of molecular iodine. SEC analysis of a sample taken after this period (conversion 88%) yields an Mn of 2,325 and an Mw/Mn of 1.31, Mz/Mw 1.25.

EXAMPLE 2

A reaction vessel was charged with 15.96 g of MMA, 10.66 g of BA, 20 g of butyl acetate, 1.53 g of $I_2$, and 2.26 g of 2,2'-azobis(2,4-dimethylvaleronitrile), degassed, and maintained under a nitrogen atmosphere. The temperature was raised to 64° C., and the reaction was continued for 8 h. After 2 h the brown iodine colour was observed to fade, an observation which coincided with a steep increase of conversion with time, after the inhibitive period in the presence of molecular iodine. SEC analysis of a sample taken after this period (conversion 82%) yields an Mn of 2,210 and an Mw/Mn of 1.48, Mz/Mw 1.47.

EXAMPLE 3

A reaction vessel was charged with 10.62 g of MMA, 15.96 g of BA, 20 g of butyl acetate, 1.53 g of $I_2$, and 2.267 g of 2,2'-azobis(2,4-dimethylvaleronitrile), degassed, and maintained under a nitrogen atmosphere. The temperature was raised to 64° C., and the reaction was continued for 20 h. After 2 h, the brown iodine colour was observed to fade. SEC analysis of a sample taken after this period (conversion 95%) yields an Mn of 2,430, an Mw/Mn of 2.04, and an Mz/Mw of 2.16.

COMPARISON EXAMPLE 4

A reaction vessel was charged with 5.31 g of MMA, 21.26 g of BA, 20 g of butyl acetate, 1.52 g of $I_2$, and 2.267 g of 2,2'-azobis(2,4-dimethylvaleronitrile), degassed, and maintained under a nitrogen atmosphere. The temperature was raised to 64° C., and the reaction was continued for 20 h. SEC analysis of a sample taken after this period (conversion 95%) yields an Mn of 2,580, an Mw/Mn of 2.17, and an Mz/Mw of 2.23.

COMPARISON EXAMPLE 5

A reaction vessel was charged with 26 g of BA, 20 g of butyl acetate, 1.67 g of $I_2$, and 2.267 g of 2,2'-azobis(2,4-dimethylvaleronitrile), degassed, and maintained under a nitrogen atmosphere. The temperature was raised to 64° C., and the reaction was continued for 4 h. SEC analysis of a sample taken after this period (conversion 93%) yields an Mn of 2,300, an Mw/Mn of 1.92, and an Mz/Mw of 2.07.

EXAMPLE 6

A reaction vessel was charged with 11.01 g of MMA, 11.00 g of BA, 8.06 g of HEMA, 20 g of butyl acetate, 1.523 g of $I_2$, and 2.26 g of 2,2'-azobis(2,4-dimethylvaleronitrile), degassed, and maintained under a nitrogen atmosphere. The temperature was raised to 64° C., and the reaction was continued for 7 h. SEC analysis of a sample taken after this period (conversion 98%) yields an Mn of 4,800, an Mw/Mn of 1.26, and an Mz/Mw of 1.31. This example shows that monomers with functional side groups may also be used.

EXAMPLE 7

To a reaction vessel maintained at 65° C. a solution consisting of 36.49 g of BMA, 6.57 g of GMA, 3.69 g of $I_2$, and 5.42 g of 2,2'-azobis(2,4-dimethylvaleronitrile) and 16 g of Dowanol® PM (glycol ether solvent ex Dow Chemical Co.) was fed over a period of 2 h, to obtain a first BMA-co-GMA block of Mn 2,880, Mw/Mn 1.25, Mz/Mw 1.19.

EXAMPLE 8

A reaction vessel was charged with 11.02 g of MMA, 11.01 g of BA, 20.06 g of butyl acetate, 1.52 g of $I_2$, and 2.26 g of 2,2'-azobis(2,4-dimethylvaleronitrile), degassed, and maintained under a nitrogen atmosphere. The temperature was raised to 64° C., and the reaction was monitored until the dark iodine colour started to fade (conversion 9%). At this point, 5.29 g of methacrylic acid and 2.75 g of Cardura® E-10 were added in one shot and the reaction was continued for 4 h. SEC analysis of a sample taken after this period (conversion 99%) yields an Mn of 2,928, an Mw/Mn of 1.32, and an Mz/Mw of 1.28.

EXAMPLE 9

To the polymer of Example 7, a mixture of 27.9 g of HEMA and 0.469 g of 2,2'-azobis(2,4-dimethylvaleronitrile) was added, together with 10 ml of Dowanol® PM, at a temperature of 64° C. After 4 h, a block copolymer was obtained with Mn 2,430, Mw/Mn 1.46, Mz/Mw 1.31.

EXAMPLE 10

A reaction vessel was charged with 30 g of MMA, 20 g of butyl acetate, 1.516 g of $I_2$, and 2.259 g of 2,2'-azobis(2,4-dimethylvaleronitrile), degassed, and maintained under a nitrogen atmosphere. The temperature was raised to 66° C., and the reaction was continued for 4.5 h. At this point, the conversion was 81%, the Mw was 3,000 (Mz/Mw 1.26), and a mixture of 5.01 g of HEMA, 5.08 g of BMA, 6 g of butyl acetate, and 0.0097 g of 2,2'-azobis(2,4-dimethylvaleronitrile) was added, and the reaction was continued for another 3.5 h. The final block copolymer had an Mw of 3,580, Mz/Mw 1.33).

EXAMPLE 11

A reaction vessel was charged with 30.05 g of MMA, 20.05 g of butyl acetate, 1.52 g of $I_2$, 2.26 g of 2,2'-azobis(2,4-dimethylvaleronitrile), degassed, and maintained under a nitrogen atmosphere. The temperature was raised to 65° C., and the reaction was continued for 6.5 h. SEC analysis of a sample taken after this period (conversion 97%) yields an Mn of 2,881, an Mw/Mn of 1.14, Mz/Mw 1.12.

Three days later, a mixture of 60 g of BMA, 35.0 g of butyl acetate, and 0.80 g of 2,2'-azobis(2,4-dimethylvaleronitrile) was slowly added to this block over a period of 3.5 h at 65° C., and polymerized for an additional 2 h to obtain a block copolymer with Mn 7,200, Mw/Mn 1.67, Mz/Mw 1.47.

EXAMPLE 12

A reaction vessel was charged with 30.0 g of MMA, 20 g of butyl acetate, 2.54 g of $I_2$, 3.83 g of 2,2'-azobis(2,4-dimethylvaleronitrile), and 2.33 g of Cardura® E-10 (versatic acid glycidyl ester, ex Resolution), degassed, and maintained under a nitrogen atmosphere. The temperature was raised to 64° C., and the reaction was continued for 5 h. SEC analysis of a sample taken after this period (conversion 95%) yields an Mn of 2,990, an Mw/Mn of 1.20, Mz/Mw 1.16.

EXAMPLE 13

To the polymer of Example 12 was added a mixture of 2.57 g of BMA, 2.5 g of butyl acetate, and 0.257 g of 2,2'-azobis(2,4-dimethylvaleronitrile). The reaction was continued for an additional 2 h (conversion 99%), to yield a block copolymer with Mn 3,263, Mw/Mn 1.21, Mz/Mw 1.18.

EXAMPLE 14

A reaction vessel was charged with 30.05 g of MMA, 20.03 g of butyl acetate, 2.54 g of $I_2$, 3.79 g of 2,2'-azobis(2,4-dimethylvaleronitrile), degassed, and maintained under a nitrogen atmosphere. The temperature was raised to 64° C., and the reaction was continued for 7 h. SEC analysis of a sample taken after this period (conversion 97%) yields an Mn of 1710, an Mw/Mn of 1.16, Mz/Mw 1.14.

To this block was added a mixture of 15.04 g of BMA, 10.06 g of butyl acetate, and 0.27 g of 2,2'-azobis(2,4-dimethylvaleronitrile) at a feeding rate of 0.187 ml/min. The polymerization of the second block was continued for a total time of 4.5 h to yield a block copolymer with Mn 2,390, Mw/Mn 1.31, Mz/Mw 1.38.

Next to the $I_2$ route, a good start to a DIT process with methacrylates can also be made if an iodine CTA, such as tosyl iodide, with a high chain transfer coefficient for methacrylates (CTC>1) is used.

The foregoing description of the present invention is merely illustrative thereof, and it is understood that variations and modification can be made without departing from the spirit or scope of the invention.

The invention claimed is:

1. A method for making a block or gradient final (co) polymer comprising a first step of radically polymerizing a mixture of ethylenically unsaturated monomers in the presence of a radical precursor and $I_2$ or a iodine chain transfer agent to obtain an iodine atom-containing intermediate polymer, wherein the iodine atom-containing intermediate polymer comprises at least 50 mole % of methacrylate monomers, followed by a second step of radically polymerizing a mixture of ethylenically unsaturated monomers in the presence of a radical precursor and the iodine atom-containing intermediate polymer wherein the intermediate polymer has end groups predominantly of the iodine-containing methacrylate type.

2. The method according to claim 1 wherein the mole ratio of the iodine atom-containing intermediate polymers to the radical precursor of the second step is greater than 0.1n, wherein n stands for the number of radicals effectively generated per molecule of radical precursor.

3. The method according to claim 1 wherein at least one of the polymerization of the first step or the polymerization of the second step occurs at a temperature lower than about 130° C.

4. The method according to claim 3 wherein the temperature is lower than 110° C.

5. The method according to claim 3 wherein the temperature is lower than 90° C.

6. The method according to claim 3 wherein the temperature is lower than 70° C.

7. The method according to claim 1 wherein the polymerization in the first and second steps are performed in the presence of an epoxide-containing compound.

8. The method according to claim 7 wherein the mole ratio of the epoxide to the iodine atom-containing intermediate polymer is greater than 0.01.

9. The method according to claim 8 wherein the mole ratio of the epoxide to the iodine atom-containing intermediate polymer is greater than 0.05.

10. A method for making a block or gradient final (co) polymer comprising a step of radically polymerizing a mixture of ethylenically unsaturated monomers in the presence of a radical precursor and an iodine atom-containing intermediate polymer or a mixture of iodine atom-containing intermediate polymers, wherein the iodine atom-containing intermediate polymer(s) comprises at least 50 mole % of methacrylate monomers wherein the end group of the intermediate polymer(s) predominately is of the iodine-containing methacrylate type.

11. The method according to claim 10 wherein the mole ratio of the iodine atom-containing intermediate polymer(s)

to the radical precursor is greater than 0.1n, wherein n stands for the number of radicals effectively generated per molecule of radical precursor.

12. The method according to claim 10 wherein the temperature during the polymerization step is lower than about 130° C.

13. The method according to claim 12 wherein the temperature is lower than 110° C.

14. The method according to claim 12 wherein the temperature is lower than 90° C.

15. The method according to claim 12 wherein the temperature is lower than 70° C.

16. The method according to claim 10 wherein the polymerization step is performed in the presence of an epoxide-containing compound.

17. The method according to claim 16 wherein the mole ratio of the epoxide to the iodine atom-containing intermediate polymer is greater than 0.01.

18. The method according to claim 16 wherein the mole ratio of the epoxide to the iodine atom-containing intermediate polymer is greater than 0.05.

19. A method according to claim 10 wherein the iodine atom-containing intermediate polymer is obtainable by polymerization of a mixture of ethylenically unsaturated monomers comprising at least 50 mole % of methacrylate monomers in the presence of a radical precursor and an iodine or an iodine chain transfer agent.

20. The method according to claim 1 wherein the mole ratio of the $I_2$ to the radical precursor of the first step is between 0.05n and 0.5n, wherein n stands for the number of radicals effectively generated per molecule of radical precursor.

21. The method according to claim 1 wherein the iodine chain transfer agent is sulfonyl iodide.

22. The method according to claim 21 wherein the mole ratio of the sulfonyl iodide to the radical precursor of the first step is greater than 0.1n, wherein n stands for the number of radicals effectively generated per molecule of radical precursor.

23. A method according to claim 1 wherein the iodine atom-containing intermediate polymer has a molecular weight of less than 10,000.

24. A method according to claim 1 further comprising a third step of removing the iodine atom in the final polymer.

25. The method according to claim 24 wherein the iodine atom is removed by nucleophilic reaction, by heating, or by reaction with a radical-generating compound, optionally under reducing conditions.

26. A block or gradient (co)polymer obtained by the method of claim 1.

27. A film forming composition comprising the block or gradient (co)polymer of claim 26.

28. A coating composition, adhesive or ink formulation comprising the block or gradient (co)polymer of claim 26.

29. An automotive or industrial coating composition comprising the block or gradient (co)polymer of claim 26.

30. A rheology additive, surfactant, dispersant, adhesion promoter or flow improvement additive comprising the block or gradient final (co)polymer of claim 26.

31. A block or gradient (co)polymer obtained by the method of claim 10.

32. A film forming composition comprising the block or gradient (co)polymer of claim 31.

33. A coating composition, adhesive or ink formulation comprising the block or gradient (co)polymer of claim 31.

34. An automotive or industrial coating composition comprising the block or gradient (co)polymer of claim 31.

35. A rheology additive, surfactant, dispersant, adhesion promoter or flow improvement additive comprising the block or gradient final (co)polymer of claim 31.

36. The method according to claim 1 wherein the iodine-containing methacrylate end group has the formula:

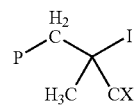

wherein P stands for polymer and CX is an acid, anhydride, ester, amide, or nitrile group.

37. The method according to claim 1 wherein the iodine atom-containing intermediate polymer additionally comprises other (co)monomers which may be of the (meth) acrylate, styrene, vinyl ester, and maleate type.

38. The method according to claim 1, wherein the molecular weight of the intermediate polymer is less than 20000.

39. The method according to claim 1 wherein the mole ratio iodine atom-containing intermediate polymer to the radical precursor is greater than 0.1n, wherein n stands for the number of radicals effectively generated per molecule of radical precursor.

40. The method according to claim 10 wherein the iodine-containing methacrylate end group has the formula:

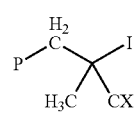

wherein P stands for polymer and CX is an acid, anhydride, ester, amide, or nitrile group.

41. The method according to claim 10 wherein the iodine atom-containing intermediate polymer additionally comprises other (co)monomers which may be of the (meth) acrylate, styrene, vinyl ester, and maleate type.

42. The method according to claim 10, wherein the molecular weight of the intermediate polymer is less than 20000.

* * * * *